United States Patent [19]

Hudson, Jr.

[11] Patent Number: 4,759,385
[45] Date of Patent: Jul. 26, 1988

[54] LOW INERTIA CHECK VALVE

[75] Inventor: Sharon J. Hudson, Jr., Lambertville, Mich.

[73] Assignee: Sharon Manufacturing Company, Lambertville, Mich.

[21] Appl. No.: 508,824

[22] Filed: Jun. 29, 1983

[51] Int. Cl.⁴ ............................................. F16K 15/14
[52] U.S. Cl. ................................. 137/512.15; 137/854
[58] Field of Search .............. 137/851, 852, 854, 859, 137/856, 512.15

[56] References Cited

U.S. PATENT DOCUMENTS

| | | | |
|---|---|---|---|
| 1,807,029 | 5/1931 | Dunning | 137/851 |
| 2,777,464 | 1/1957 | Mosely | 137/854 |
| 3,954,121 | 5/1976 | Kardos | 137/854 |
| 4,141,379 | 2/1979 | Manske | 137/859 |
| 4,229,832 | 10/1980 | Dickson, Sr. | 137/854 |
| 4,319,452 | 3/1982 | Morita et al. | 137/512.15 |

Primary Examiner—Robert G. Nilson
Attorney, Agent, or Firm—Harold F. Mensing

[57] ABSTRACT

A low inertia springless check valve suitable for operation at high frequencies in a hot environment against a high cyclic back pressure with a relatively constant low input pressure, such as in an automotive engine exhaust air induction system. The valve has a circular elastomeric diaphragm mounted on a supporting frame by means of a retainer disk, a fastener and a diaphragm limiter. A central portion of the diaphragm is compressed between the disk and limiter to cause the originally flat diaphragm to become dished and biased towards the valve seat. The limiter is designed to stabilize, in the flow direction, a portion of the diaphragm extending along the entire length of an adjacent diameter of the diaphragm. The retainer disk also functions in part as a diaphragm motion limiter in the check direction.

29 Claims, 3 Drawing Sheets

LOW INERTIA CHECK VALVE

BACKGROUND OF THE INVENTION

This invention relates to a low inertia check valve that is designed for operation at high cyclic frequencies and under other varying severe conditions.

More specifically the check valve is designed for use in automotive engine exhaust air induction systems where the valve operates in a high temperature environment under high cyclic back pressure created in the exhaust system. The check valve must allow input flow there through at relatively low pressures and with a minimum of pressure drop. Additionally it must operate effectively over a wide range of cyclic frequencies such as relatively low cyclic frequencies which occur when an engine is running at idle speed and at relatively high frequencies which occur when the engine is running at top speed. Since the check valve has an elastomeric diaphragm which forcibly comes in contact with portions of the component parts of the valve, these components must be designed to minimize abuse of the diaphragm.

SUMMARY OF THE INVENTION

The disclosed invention relates to a low inertia check valve suitable for use in automotive engine exhaust air induction system. The check valve has a springless diaphragm support assembly which includes an annular support frame, an arcuate diaphragm limiter connected at opposite ends to the frame, a diaphragm and a diaphragm retainer. Prior to assembly the diaphragm is in the form of a flat circular piece. The diaphragm is made of elastomeric sheet material and when it is mounted on the support frame assembly between the limiter and retainer the central portion thereof is compressed a preselected amount sufficient to cause an outer portion to become dished away from the limiter towards the retainer. The limiter is circular and matches the diaphragm in size but it is formed into a substantially semi cylindrical shape. The diaphragm support assembly is mounted in a canister between two frusto-conical canister members that are disposed concentrically with their large ends in a confronting relationship. The diaphragm support assembly is enclosed by frusto-conical canister members of different size. One of them defines the outlet chamber of the valve and is larger in diameter and axial length than the other one which defines the input chamber. The input chamber canister member is provided with an annular seat that incorporates the inside edge of the large end of its frusto-conical body. Means for connecting the valve into a system are provided at opposite ends of the valve body. Preferably the component parts of the check valve other than the elastomeric diaphragm are made of metal.

The features and advantages of this invention will be understood best if the following description is read in conjunction with the accompanying drawings.

GENERAL DESCRIPTION OF THE INVENTION

Figure 1:
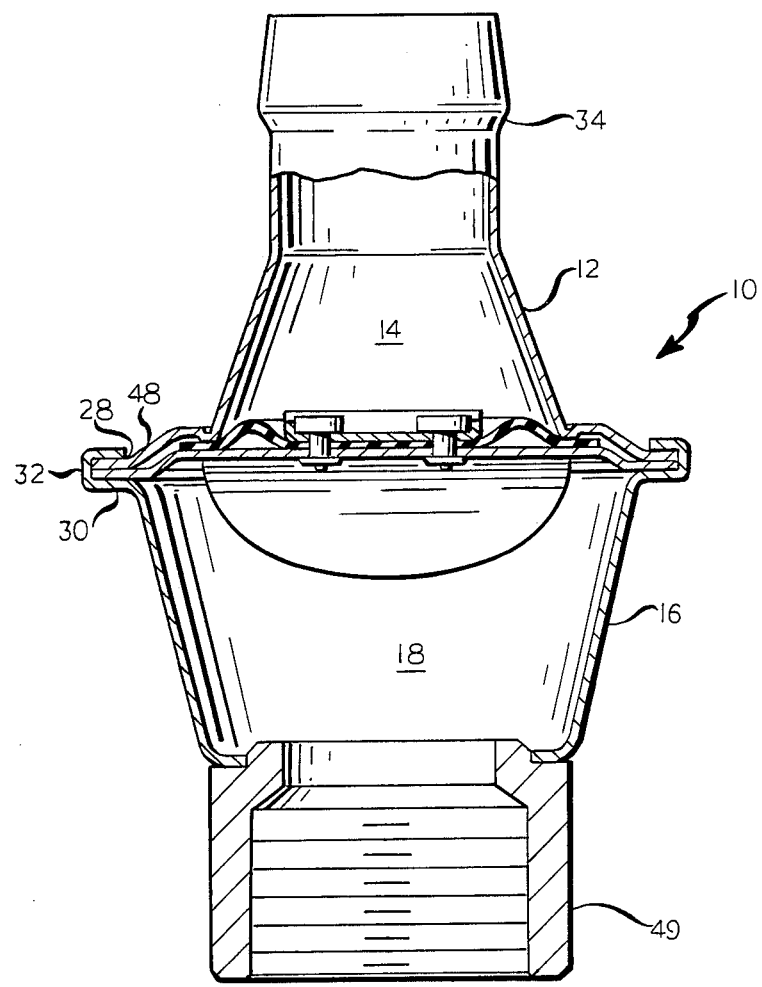
FIG. 1 is an enlarged partially sectioned side view showing the preferred embodiment of the check valve.

Referring to the drawings, FIG. 1 shows a sideview of the check valve 10 partially sectioned along an axially extending plane. The valve has a housing or canister basically made of two frusto-conical body sections. One frusto-conical section 12 defines an input chamber 14 and the other 16 defines an output chamber 18. The frusto-conical sections are disposed with their large ends or bases facing one another and are peripherally sealed together. Preferably this is accomplished by providing each of them with a laterally disposed flat peripheral flange 28 or 30. Flange 30 is provided with a surrounding lip 32 having an I.D. (internal diameter) sized to closely contain the flange 28 of the frusto-conical section 12. Lip 32 has sufficient width to allow it to be pressed inwardly over the edge of flange 28 to lock the canister sections together along with the annular ring of the diaphragm support assembly which is sandwiched therebetween. While the lip is shown as an integral part of output chamber section 16 it could easily be formed on input chamber section 12 or even be made as a separate part. Its function is to coaxially align the frusto-conical sections and the diaphragm support assembly during final assembly and then seal the canister sections together.

Figure 6:
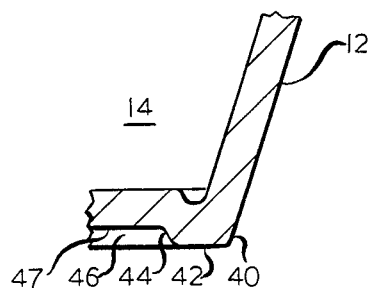
FIG. 6 is a further enlarged fractional view showing a cross sectional view of the annular seat and adjacent portions of the inlet canister member.

Input chamber section 12 has a plumbing fitment 34, such as a male hose connector, integrally attached to the small outer end of its frusto-conical body. The larger inner end of input chamber section 12 is provided with a formed annular rib or seat 40 (see FIG. 6). This seat 40 has a truncated triangular cross sectional shape with its inner angular side being the inner edge surface of the body of frusto-conical section 12. The truncated end 42 is substantially flat and has a width of 0.03 of an inch for a seat having an inside diameter of about 1.1 inches. The other angular side 44 defines a side portion of a concentric annular recess 46 disposed around the seat 40. This recess has a generally flat wall 47 which extends laterally from the outer edge of the seat 40 to a location beyond the edge of the diaphragm where it is connected to the aforementioned flat lateral flange 28 by means of an inclined annular wall section 48 such that the outer flange lies in a plane that is located beyond the plane of the seat 40. The axial distance between the inside surface of the flat recess wall 47 and the seat is in this instance 0.01 of an inch. The inside diameter of the large end of input chamber 14, in the illustrated example, is the same as the diameter of the inner edge of the annular seat 40 because of their coincidence and this diameter is less than the corresponding inner diameter of the large or base end of the frusto-conical output chamber 18. Preferably it is about one-fourth smaller. The sidewall angle of the input chamber 14 is 19° and its axial length is 0.7 of an inch.

In the example disclosed here and illustrated in the drawings, the wall angle of the output chamber 18 is 13°, the axial length is 0.9 of an inch and the inside diameter at its large end is 1.6 of an inch. These factors combine to provide an output chamber volume which is substantially greater than the volume of the input chamber. A threaded female plumbing fitment 49 is affixed to the small diameter end of output chamber 18.

Figure 2:
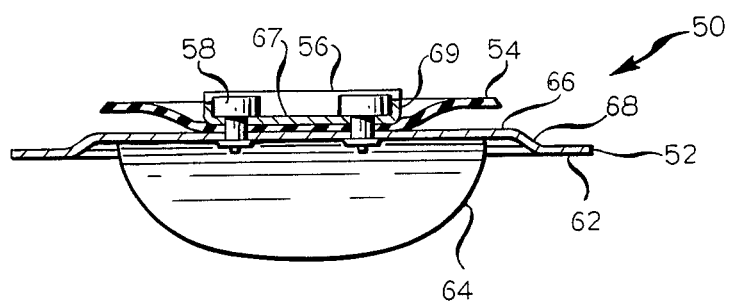
FIG. 2 is a sectional view of the diaphragm support assembly taken along lines 2—2 of FIG. 3 showing the cross sectional shape of the elastomeric diaphragm prior to final assembly in the valve canister.
Figure 3:
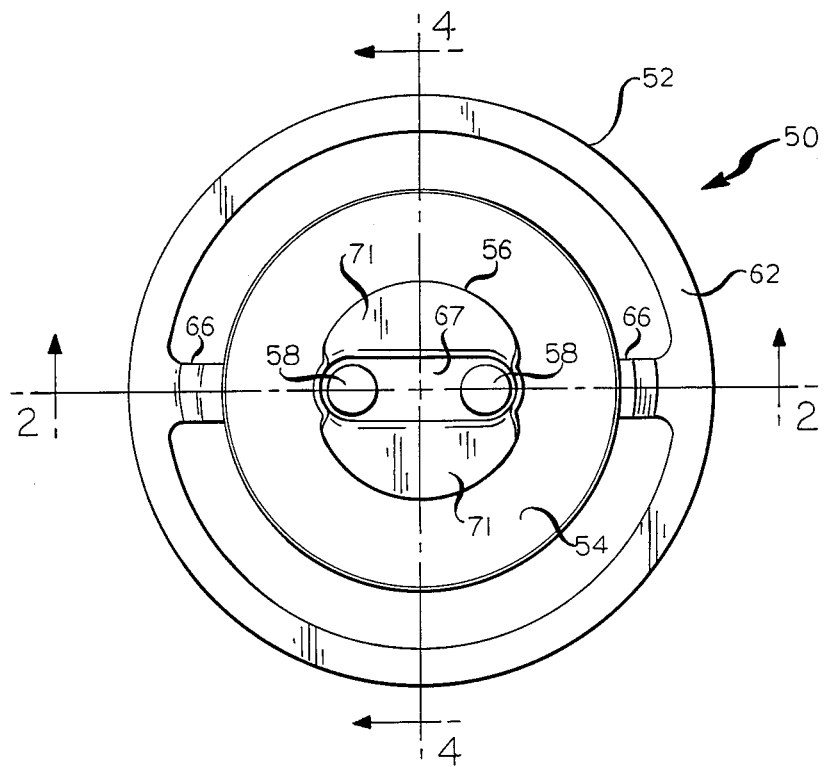
FIG. 3 is a plan view of the diaphragm support assembly of FIG. 2.
Figure 4:
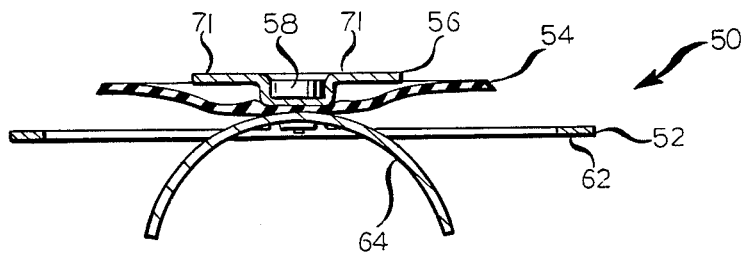
FIG. 4 is a sectional view of the diaphragm support assembly taken along lines 4—4 of FIG. 3.

The diaphragm support assembly 50 comprises a diaphragm supporting frame 52, a diaphragm 54, a diaphragm retainer 56 and at least one fastener 58 for holding its components together. The supporting frame is preferably made from a circular piece of sheet metal and has a flat outer ring 62 and an arcuate diaphragm limiter 64 integrally connected to the inside of the ring by means of two narrow radially disposed webs 66 located at diametrically opposed positions. Preferably the webs 66 each have an inclined riser or step 68 (see FIG. 2) midway between the limiter 64 and outer ring 62 so as to offset the limiter towards the input end of the valve. The offset should not be so great as to reduce the clearance between the webs 66 and closest point on the annular seat 40 to less than the thickness of the diaphragm when assembled. Preferably the above mentioned clearance is on the order of 0.005".

Figure 7:
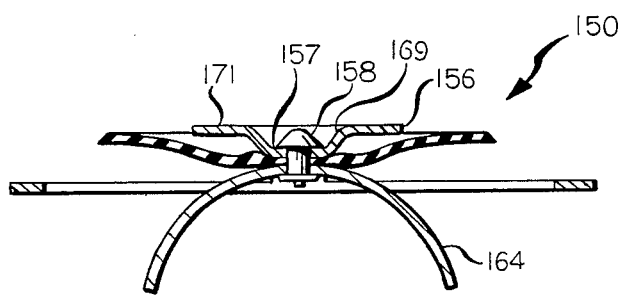
FIG. 7 is a sectional view of a diaphragm support assembly similar to the one shown in FIG. 2 but having only a single rivit fastening the components together.

The diaphragm limiter 64 is substantially circular prior to being formed into its arcuate shape. Its size substantially matches the size of the diaphragm but could be slightly smaller. Preferably the arcuate limiter is formed on a cylindrical shaped die such that it has an unbent diameter which coincides with the centerline of the webs and is disposed in a plane that includes the axis of the cylindrical forming die. In other words the limiter 64 has a partially cylindrical shape as if it were produced by laying a circular pattern on a cylindrical tube having a smaller radius and cutting the limiter from the tube in accordance with the pattern. The radius of curvature of the inside of the limiter is preferably about two-thirds of the radius of the circular limiter. The curvature is away from the diaphragm and towards the output end of the valve. The throat area of the valve herein defined as the open area between the edge of the limiter 64 and the closest points on the inside of the output chamber, should be about one-fourth larger than the open area of the input fitment 34. In the embodiment shown in FIGS. 1-4 the limiter has two fastener holes of equal diameter spaced equidistantly at least one diameter from opposite sides of the center of the limiter and centered on the aforementioned unbent diameter or centerline. FIG. 7 shows essentially the same limiter 164 with a single fastener hole in its center.

Two different diaphragm retainers are illustrated in the drawings. The two-fastener retainer embodiment 56 (see FIGS. 2-4) has an oblong flat central section 67 with parallel sides and semi circular ends. A narrow wall 69 having a radiused connecting edge surrounds the oblong central section 67. Circular portions or planar wings 71 extend outwardly in a plane from the top of the parallel sides of the arcuate wall so that the peripheral shape of the retainer is substantially circular. Fastener holes centered in the semi circular ends of the flat central section 67 are provided for fasteners 58 such as flat headed shouldered rivits.

The single fastener embodiment incorporated in diaphragm support assembly 150 shown in FIG. 7 is in the form of a circular dish 156 with a apertured flat circular base section 157 an arcuately flared intermediate wall section 169 and a flat annular rim 171. The depth of the dish of retainer is approximately the same as the depth of the dish of the diaphragm when the diaphragm is measured after it has been mounted on the limiter but before the diaphragm support assembly is inserted in the valve canister. This feature is common to both retainer embodiments. Another feature common to both is that all sharp edges are blunted such as by tumbling a plurality of retainers in a drum with an abrasive. These retainers 56, 156 in addition to compressing the central portion of the diaphragm also serve as diaphragm motion limiter in the check direction. They support the diaphragms and prevent their collapse during operation when the back pressure peak exceeds the input pressure in the valve.

Figure 5:
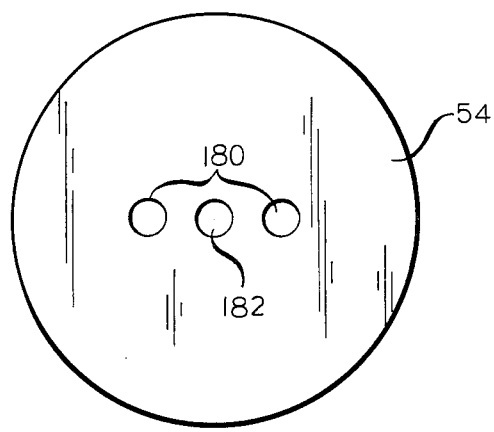
FIG. 5 is a plan view of the elastomeric diaphragm prior to assembly on the diaphragm supporting components.

For automotive use the diaphragm 54 is made of a fluroelastomer having relatively stable physical properties over a temperature range of −20° F. to 300° F. and preferably up to 450° F. Such elastomers are produced by E. I. PuPont D E Nemours and Co., and Minnesota Mining and Manufacturing Co., under the respective tradenames of Viton and Florel. The elastomer is also fuel and oil resistant. Preferably the elastomeric diaphragm 54 is made of sheet material having a uniform thickness of 0.03 of an inch and a durometer of 70 for the example disclosed here. The diaphragm 54 is circular and has a diameter of 1.3 of an inch. Three one-eighth inch diameter holes spaced on center distances of about one and two-thirds diameters apart are provided along a diameter of the diaphragm. The outside pair of holes 180 are for the fasteners 58 and the inside hole 182 (see FIG. 5) is a relief hole that allows surrounding portions of the diaphragm to be cold extruded into the relief area when the diaphragm 54 is compressed between the retainer 56 and limiter 64 during the assembly of the diaphragm assembly. In the single fastener embodiment 150 the diaphragm is only provided with a center hole 182 for its fastening rivit 158. In both diaphragm support assemblies 50 and 150 the area of diaphragm compression is about one-tenth of the diaphragm area and this fractional area of the diaphragm is compressed to between 75-85% of its original thickness. It is to be noted that each of the diaphragms is compressed between a flat surface on the retainer and an opposed arcuate surface on the limiter.

The above disclosed low inertia check valve functions effectively at frequencies of 100 cycles per second and input pressures as low as one-half PSI (pounds per square inch) with cyclic back pressures peaking as high as ten PSI. Although the separate contributions to the overall operating effectiveness of the check valve, provided by the relative shapes, sizes and positions of the various components, have not been precisely determined, it appears that all of them contribute something to enhance its effectiveness, durability or ease of manufacturing. It is also to be understood that the disclosed valve can be scaled up or down in size depending upon throughput requirements and it can be used in less severe environments than those found in automotive exhaust air induction systems.

The scope of this invention is defined best by the appended claims.

What is claimed is:

1. A low inertia check valve comprising: a canister member with a diverging circular sidewall defining an input chamber, said input chamber having an annular valve seat on its said large end; another canister member with a converging circular sidewall defining an output chamber; said members being disposed with their large ends in confronting relationship; means for sealingly connecting said canister members together in this relationship; and a diaphragm support assembly disposed between said members, said diaphragm support assembly including an elastomeric diaphragm, a diaphragm limiter on the output chamber side of said diaphragm, a diaphragm retainer on the input side of said diaphragm and means for fastening said diaphragm support assembly components together, causing a central portion of said diaphragm to be compressed between said retainer and said limiter an amount sufficient to bias outer portions of said diaphragm toward said seat.

2. A low inertia check valve according to claim 1 wherein the compressing surface of said diaphragm retainer is flat and the compressing surface of said limiter is arcuate.

3. A low inertia check valve according to claim 1 wherein the compressing surface of said diaphragm retainer is oblong and has parallel sides and semi circular ends.

4. A low inertia check valve according to claim 3 wherein said compressing surface of said diaphragm retainer is flat and surrounded by a narrow upright wall extending outwardly from said flat surface and integrally connected to said surface by a radiused edge.

5. A low inertia check valve according to claim 1 wherein the area of compression is one-tenth of the diaphragm area.

6. A low inertia check valve according to claim 1 wherein the compressed portion of said diaphragm is compressed to between 75–85% of its original thickness.

7. A low inertia check valve according to claim 1 wherein the surface of said limiter adjacent to the diaphragm is substantially semi cylindrical.

8. A low inertia check valve according to claim 1 wherein the inside diameter of the large end of said output chamber is greater than the inside diameter of the large end of said input chamber.

9. A low inertia check valve according to claim 8 wherein the large diameter end of said output chamber is one-fourth larger than the large diameter end of said input chamber.

10. A low inertia check valve according to claim 8 wherein the axial length of said output chamber is greater than the axial length of said input chamber.

11. A low inertia check valve according to claim 1 wherein said chambers have frusto-conical bodies.

12. A low inertia check valve according to claim 11 wherein the wall angle of said input chamber is greater than the wall angle of said output chamber.

13. A low inertia check valve according to claim 1 wherein said valve seat has a truncated triangular cross sectional shape and the inner angular side of said triangular cross sectional shape is a portion of the inside edge of said diverging circular sidewall.

14. A low inertia check valve according to claim 1 wherein said diaphragm is made of a fluoroelastomer having a durometer of 70 and a uniform thickness prior to assembly.

15. A low inertia check valve comprising: a canister member with a diverging circular sidewall defining an input chamber, said input chamber having an annular valve seat on its said large end; another canister member with a converging circular sidewall defining an output chamber; said members being disposed with their large ends in confronting relationship; means for sealingly connecting said canister members together in this relationship; and a diaphragm support assembly disposed between said members, said diaphragm support assembly including an elastomeric diaphragm, a diaphragm limiter on the output chamber side of said diaphragm, a diaphragm retainer on the input side of said diaphragm, a support frame having an annular outer ring sandwiched between said canister members and two diametrically opposed integral radial web members extending between said diaphragm limiter and said outer ring, said web members being spaced from the closest portions of said seat by an amount greater than the thickness of said diaphragm and means for fastening said diaphragm support assembly components together, causing a central portion of said diaphragm to be compressed between said retainer and said limiter.

16. A low inertia check valve according to claim 15 wherein said limiter is circular and is bent into a substantially semi cylindrical shape thus inherently having one unbent diameter with the centerline of said webs being aligned with said unbent diameter.

17. A low inertia check valve comprising: a canister member with a diverging circular sidewall defining an input chamber, said input chamber having an annular valve seat on its said large end; another canister member with a converging circular sidewall defining an output chamber; said members being disposed with their large ends in confronting relationship; means for sealingly connecting said canister members together in this relationship; and a diaphragm support assembly including an elastomeric diaphragm having a center relief hole into which surrounding portions of said diaphragm are cold extruded during assembly, a diaphragm limiter on the output chamber side of said diaphragm, a diaphragm retainer on the input side of said diaphragm and means for fastening said diaphragm support assembly components together, causing a central portion of said diaphragm to be compressed between said retainer and said limiter.

18. A low inertia check valve comprising: a canister member defining an input chamber; another canister member defining an output chamber, each chamber having a large circular end and a small end with their large ends being disposed concentrically in confronting relationship, said input chamber having an annular valve seat on its said large end; a diaphragm support assembly disposed between said members, said diaphragm support assembly including an elastomeric diaphragm, a diaphragm limiter on the output chamber side of said diaphragm, said diaphragm limiter being circular and having an arcuate form with an unbent diameter, a diaphragm retainer on the input chamber side of said diaphragm and means for fastening said diaphragm support assembly components together causing a central portion of said diaphragm to be compressed between said retainer and said limiter; and means for sealingly connecting said canister members together in said confronting relationship with said diaphragm support assembly therebetween.

19. A low inertia check valve according to claim 18 wherein said diaphragm support assembly includes a support frame having an annular outer ring sandwiched between said canister members, and two diametrically opposed radial web members extending between said diaphragm limiter and said outer ring, said web members being radially disposed with their centerlines aligned with said unbent diameter, said web members also being spaced from the closest portions of said seat by an amount greater than the thickness of said diaphragm therebetween.

20. A low inertia check valve according to claim 19 wherein said web members have steps which offset said limiter from said annular outer ring towards said input chamber.

21. A low inertia check valve according to claim 18 wherein said chambers are frusto-conical and the inside diameter of the large end of said output chamber is greater than the inside diameter of the large end of said input chamber.

22. A low inertia check valve according to claim 21 wherein the large diameter end of said output chamber is one-fourth larger than the large diameter end of said input chamber diameter, and the axial length of said output chamber is greater than the axial length of said input chamber.

23. A low inertia check valve according to claim 21 wherein the wall angle of said input chamber is greater than the wall angle of said output chamber.

24. A low inertia check valve according to claim 18 wherein said valve seat has a truncated triangular cross sectional shape and the inner angular side of said triangular cross sectional shape is a portion of the inside edge surface of said diverging circular sidewall.

25. A low inertia check valve according to claim 18 wherein the compressing surface of said diaphragm retainer is oblong and has parallel sides and semi circular ends.

26. A low inertia check valve according to claim 25 wherein said diaphragm has two fastener holes spaced on opposite sides of a center relief hole.

27. A low inertia check valve according to claim 25 wherein said compressing surface is flat and surrounded by a narrow wall having a radiused lower end.

28. A low inertia check valve according to claim 18 wherein the area of compression is one-tenth of the diaphragm area.

29. A low inertia check valve according to claim 18 wherein the compressed portion of said diaphragm is compressed to between 75–85% of its original thickness to thereby bias outer portions of said diaphragm towards said seat.

* * * * *